United States Patent
Gui et al.

(10) Patent No.: US 6,829,890 B2
(45) Date of Patent: Dec. 14, 2004

(54) FORCED REGENERATION OF A DIESEL PARTICULATE FILTER

(75) Inventors: Xinqun Gui, Naperville, IL (US); Steven P. Gravante, Westchester, IL (US); Shouxian Ren, Aurora, IL (US); Pranab K. Das, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/217,729

(22) Filed: Aug. 13, 2002

(65) Prior Publication Data

US 2004/0031262 A1 Feb. 19, 2004

(51) Int. Cl.$^7$ .................................................. F01N 3/00
(52) U.S. Cl. ............................. 60/295; 60/274; 60/278; 60/280; 60/311
(58) Field of Search ..................... 60/274, 278, 280, 60/295, 297, 311

(56) References Cited

U.S. PATENT DOCUMENTS

| | | | |
|---|---|---|---|
| 6,090,187 A | * | 7/2000 | Kumagai ..................... 95/278 |
| 6,253,543 B1 | * | 7/2001 | Russell ......................... 60/274 |
| 6,276,139 B1 | * | 8/2001 | Moraal et al. ............. 60/605.2 |
| 6,405,528 B1 | * | 6/2002 | Christen et al. .............. 60/295 |
| 6,470,682 B2 | * | 10/2002 | Gray, Jr. ..................... 60/605.2 |
| 6,497,095 B2 | * | 12/2002 | Carberry et al. ............. 60/295 |
| 6,546,721 B2 | * | 4/2003 | Hirota et al. ................. 60/295 |

\* cited by examiner

Primary Examiner—Thomas Denion
Assistant Examiner—Diem Tran
(74) Attorney, Agent, or Firm—Dennis Kelly Sullivan; Susan L. Lukasik; Jeffrey P. Calfa

(57) ABSTRACT

An engine control system (22) of a diesel engine (20) that powers a motor vehicle processes data in execution of a strategy (FIG. 4) to provide control of both timing and duration of forced regeneration of a diesel particulate filter (42). The overall strategy is a hybrid of model-based and closed-loop control strategies. Redundant elements of the strategy (FIG. 6) determine when forced regeneration is called for. Forced regeneration is initiated by retarding the timing of the start of main fuel injection (100). Fueling is then adjusted (98) both to enhance catalytic action and to make the process transparent to a driver of the vehicle.

34 Claims, 7 Drawing Sheets

FORCED REGENERATION OF A DIESEL PARTICULATE FILTER

FIELD OF THE INVENTION

This invention relates generally to diesel engines that have diesel particulate filters for treating exhaust gases passing through their exhaust systems. More particularly, the invention relates to engine systems and methods for forcing regeneration of such filters.

BACKGROUND OF THE INVENTION

A known electronic engine control system comprises a processor-based engine controller that processes data from various sources to develop control data for controlling certain functions of the engine. The amount and the timing of engine fueling are two functions that are controlled by an engine control system. A typical diesel engine that comprises fuel injectors for injecting fuel into the engine cylinders under control of an engine control system controls both the duration and the timing of each fuel injection to set both the amount and the timing of engine fueling. In a turbocharged diesel engine, the electronic engine control system also exercises control over turbocharger boost.

An exhaust system of a diesel engine that comprises a diesel particulate filter (DPF) is capable of physically trapping diesel particulate matter (DPM) in exhaust gas passing through the exhaust system from the engine. This prevents significant amounts of DPM from entering the atmosphere.

DPM includes soot or carbon, the soluble organic fraction (SOF), and ash (i.e. lube oil additives etc.). The trapping of those constituents by a DPF prevents what is sometimes seen as black smoke billowing from a vehicle's exhaust pipe. The organic constituents of trapped DPM, i.e. carbon and SOF, are oxidized within the DPF at appropriate times and under appropriate conditions to form $CO_2$ and $H_2O$, which can then pass through and exit the exhaust pipe to atmosphere. The ash collects within the DPF over time, progressively aging the DPF by gradually reducing its trapping efficiency.

One type of known DPF is marketed by Johnson Matthey Company under the trade name "Continuously Regenerating Trap" or (CRT™). An oxidation catalyst is disposed upstream of the DPF. The oxidation catalyst oxidizes hydrocarbons (HC) to $CO_2$ and $H_2O$ and converts NO to $NO_2$. The $NO_2$ oxidizes carbon trapped in the DPF. While $O_2$ could be used to oxidize DPM, the high temperatures for accomplishing oxidation make $O_2$ rather impractical for treating diesel engine exhaust without the aid of still another catalyst such as cerium-oxide ($CeO_2$), and as one might expect, the inclusion of a second catalyst would make such an exhaust treatment system even more expensive.

Another type of known DPF is marketed by Englehard Corporation under the trade name DPX™. It is sometimes referred to as a Catalyzed Soot Filter (or CSF). The Engelhard CSF has an additional $CeO_2$ catalyst that eliminates the need for an upstream oxidation catalyst, which in turn reduces the overall size of a DPF and avoids the greater pressure drops present in a two-substrate DPF like a CRT™ filter. In both types of DPF, the oxidation catalyst oxidizes hydrocarbons (HC) and converts NO to $NO_2$, with the $NO_2$ then being used to oxidize the trapped carbon.

The rate at which trapped carbon is oxidized to $CO_2$ is controlled not only by the concentration of $NO_2$ or $O_2$ but also by temperature. Specifically, there are three important temperature parameters for a DPF.

The first is the oxidation catalyst's "light off" temperature, below which catalyst activity is too low to oxidize HC. That temperature is typically around 180–200° C.

The second controls the conversion of NO to $NO_2$. This NO conversion temperature spans a range of temperatures having both a lower bound and an upper bound, which are defined as the minimum temperature and the maximum temperature at which 40% or greater NO conversion is achieved. The conversion temperature window defined by those two bounds extends from approximately 250° C. to approximately 450° C.

The third temperature parameter is related to the rate at which carbon is oxidized in the filter. Reference sources in relevant literature call that temperature the "Balance Point Temperature" (or BPT). It is the temperature at which the rate of oxidation of particulate, also sometimes referred to as the rate of DPF regeneration, is equal to the rate of accumulation of particulate. The BPT is one of the parameters that is especially important in determining the ability of a DPF to enable a diesel engine to meet expected tailpipe emissions laws and/or regulations.

Typically, a diesel engine runs relatively lean and relatively cool compared to a gasoline engine. That factor makes natural achievement of BPT problematic. Therefore, a manufacturer of a DPF for a diesel engine should strive for a design that minimizes BPT, and a diesel engine manufacturer should strive to develop engine control strategies for raising the exhaust gas temperature to temperatures in excess of BPT whenever the amount of trapped particulates exceeds some threshold that has been predetermined in a suitably appropriate manner, such as by experimentation. Using an engine control to raise exhaust gas temperature in this way is called forced regeneration.

Investigation of several methods for initiating a forced regeneration of a DPF has disclosed that retarding the start of main fuel injections seems to be the most effective way to elevate exhaust gas temperature. That method is able to increase the exhaust gas temperature sufficiently to elevate the catalyst's temperature above catalyst "light off" temperature and provide excess HC that can be oxidized by the catalyst. Such HC oxidation provides the necessary heat to raise the temperature in the DPF above the BPT.

The method has been validated in a motor vehicle powered by a diesel engine whose exhaust system has a DPF. The DPF was loaded with soot, and regeneration was forced at low idle, 30 mph, 60 mph and high idle driving conditions. It was discovered that complete DPF regeneration may not always occur, as evidenced by the incomplete removal of all accumulated soot. Although a full understanding of that phenomenon has not yet been attained, the method does offer promise for eventual commercialization.

SUMMARY OF THE INVENTION

The present invention relates to engine systems and methods for accomplishing forced regeneration of DPF's, preferably by retarding timing of engine fueling to create suitable exhaust gas temperatures.

A presently preferred embodiment of the invention disclosed herein comprises several sub-system models, including an engine emissions model, a DPM oxidation model, a DPM accumulation model, and an ash accumulation model. Data for various parameters relating to engine and DPF operation are processed through the models, and results are used to initiate and terminate forced regenerations via regeneration initiation/termination logic. The timing and the duration of a forced regeneration are thereby controlled.

Examples of data processed by an engine control system processor for accomplishing this objective include pressure, temperature and O2 concentration data relevant to the DPF.

The forced regeneration process is itself conducted according to an algorithm that processes certain data to adjust both engine fueling and the timing of engine fueling to elevate exhaust gas temperature to a range sufficient to exceed the BPT of the DPF while at the same time striving for transparency of the process to the manner in which the motor vehicle is being driven so that the driver of the vehicle will not perceive that forced regeneration is occurring. The invention inherently accounts for altitude and ambient temperature effects, and it also accounts for DPF aging through use of the ash accumulation model. If a diesel engine has a turbocharger that provides boost, the invention also makes certain adjustments in control of the turbocharger to minimize effects of the elevated exhaust gas temperature on boost as forced regeneration proceeds.

Accordingly, several generic aspects of the present invention relate to a method of imposing a forced regeneration cycle on a DPF that treats exhaust gas passing through an exhaust system of a diesel engine to force regeneration of the DPF.

According to one of these several generic aspects, data that represents engine speed, data that represents engine fueling, data that represents turbocharger boost, and data that represents exhaust gas recirculation (EGR) from the exhaust system back into the engine, are processed, while the engine is running, through an engine emissions model to yield values representing rates at which DPM from the engine is entering the exhaust system and values for NOX concentration in the exhaust gas. The values for NOX concentration in the exhaust gas, values representing concentration of O2 in the exhaust gas entering the DPF, and values representing temperature of exhaust gas entering the DPF are repeatedly processed through a DPM oxidation model to yield values of DPM oxidation rate data representing the rate at which DPM is being oxidized in the exhaust system. The values of DPM oxidation rate data and the values representing a rate at which DPM from the engine is entering the exhaust system are repeatedly processed through a DPM accumulation model to yield values of net DPM accumulation representing net accumulation of DPM in the DPF at various points of time while the engine is running. Accumulated engine running time is processed through an ash accumulation model to yield data representing ash accumulation in the DPF. The values of net DPM accumulation and the data representing ash accumulation are repeatedly processed through regeneration initiating/terminating logic for commanding a forced regeneration cycle when a result of the latter processing calls for initiation of forced regeneration of the DPF and for discontinuing the forced regeneration cycle when a subsequent result calls for termination of the forced regeneration cycle.

According to another of these several generic aspects, data that represents parameters useful in determining a rate at which DPM is accumulating in the DPF is repeatedly processed through a DPM accumulation model to yield values of DPM accumulation representing accumulation of DPM in the DPF at various points of time as the engine runs. The values of DPM accumulation and data that distinguishes DPM accumulation values calling for forced regeneration from those not calling for forced regeneration are also processed, and when a result of the latter processing discloses that a DPM accumulation value calls for forced regeneration of the DPF, forced regeneration is initiated by retarding the timing of engine fueling to elevate the exhaust gas temperature to a temperature for forcing regeneration. As the forced regeneration cycle progresses, baseline engine fueling data representing engine fueling at commencement of the forced regeneration cycle, engine speed data that represents engine speed, data representing light off temperature of catalytic material of the DPF, and data representing actual temperature of the catalytic material, are processed to yield adjusted timing values for timing of engine fueling and fueling modification values. Engine fueling data representing engine fueling in the absence of forced regeneration of the DPF and the fueling modification values are processed to yield adjusted fueling values. As the forced regeneration continues, the adjusted fueling values are used instead of the engine fueling data for fueling the engine, and the adjusted timing values are used for the timing of engine fueling.

According to still another of these several generic aspects, data that represents temperature of exhaust gas entering the DPF, data that represents exhaust gas flow entering the DPF, and data that utilizes both exhaust gas temperature and flow to distinguish a DPF that has trapped an amount of DPM calling for forced regeneration from a DPF that does not call for forced regeneration, are processed to yield result data that a) calls for forced regeneration when the data that represents temperature of exhaust gas entering the DPF and the data that represents exhaust gas flow entering the DPF disclose that the DPF has trapped an amount of DPM calling for forced regeneration, and b) calls for no forced regeneration when the data that represents temperature of exhaust gas entering the DPF and the data that represents exhaust gas flow entering the DPF disclose that the DPF does not call for regeneration. When the result data calls for forced regeneration of the DPF, forced regeneration is initiated by retarding the timing of engine fueling to elevate the exhaust gas temperature to a temperature for forcing regeneration of the DPF. As the forced regeneration cycle progresses, baseline engine fueling data representing engine fueling at commencement of the forced regeneration cycle, engine speed data that represents engine speed, data representing light off temperature of catalytic material of the DPF, and data representing actual temperature of the catalytic material, are processed to yield adjusted timing values for timing of engine fueling and fueling modification values. Engine fueling data representing engine fueling in the absence of forced regeneration of the DPF and the fueling modification values are processed to yield adjusted fueling values. As the forced regeneration cycle continues, the adjusted fueling values are used instead of the engine fueling data for fueling the engine, and the adjusted timing values are used for the timing of engine fueling.

According to yet another of these several generic aspects, data that represents a rate at which DPM from the engine is entering the exhaust system, data that represents a rate at which DPM is being oxidized in the exhaust system, and data that represents DPM trapping efficiency of the DPF, are processed to yield values representing net rate at which DPM is being trapped in the DPF at various points of times as the engine runs. The values representing net rate at which DPM is being trapped and data representing effective geometric size of DPM trapping medium in the DPF are processed to yield values representing DPM trapped in the DPF per unit of geometric size of the DPM trapping medium. The values representing DPM trapped in the DPF per unit of geometric size of the DPM trapping medium and data distinguishing values of DPM trapped in the DPF per unit of geometric size of the DPM trapping medium that call for forced regeneration from those that do not are also processed, and when a result of the latter processing discloses that a value of data representing DPM trapped in the DPF per unit of geometric size of the DPM trapping medium calls for regeneration, the engine is operated in an elevated temperature mode of operation that elevates the exhaust gas temperature to a temperature for forcing regeneration. When a subsequent result discloses that a value of data representing DPM trapped in the DPF per unit of geometric size of the DPM trapping medium does not call for regeneration, operation of the engine in the elevated temperature mode of operation is discontinued.

According to yet one more of these several generic aspects, data for a first set of engine operating parameters is processed is running to yield values representing amounts of accumulation of DPM in the DPF at various points of times as the engine runs, and data for a second set of engine operating parameters different from the first set of engine operating parameters is also processed to yield values representing amounts of accumulation of DPM in the DPF at various points of times as the engine runs. When the processing of data for one of the first and second sets of engine operating parameters discloses a value calling for regeneration, the engine is operated in a mode of operation for forcing regeneration, and when a value resulting from subsequent processing of data for the one set of engine operating parameters discloses an amount of accumulation of DPM in the DPF does not call for regeneration, that mode of engine operation is discontinued.

According to yet one more of these several generic aspects, both baseline engine fueling data representing engine fueling at commencement of the forced regeneration cycle and engine speed data that represents engine speed are repeatedly processed according to a map that correlates values representing various timings for engine fueling during the forced regeneration cycle with both values of baseline engine fueling and values of engine speed to yield timing values for the timing of engine fueling as the forced regeneration cycle progresses. Data representing light off temperature of catalytic material of the DPF and data representing actual temperature of the catalytic material are repeatedly processed as the forced regeneration cycle progresses, to yield adjustment values for adjusting the timing values. The adjustment values and the timing values are processed to yield adjusted timing values for the timing of engine fueling during the forced regeneration cycle. The adjusted timing values and the engine speed data are processed according to a map that correlates fueling modification values with both the adjusted timing values and values of engine speed to yield fueling modification values. Engine fueling data representing engine fueling in the absence of forced regeneration of the DPF and the fueling modification values are processed to yield adjusted fueling values. As the forced regeneration cycle continues, the adjusted fueling values are used instead of the engine fueling data for fueling the engine, and the adjusted timing values are used for the timing of engine fueling.

Another aspect of the invention relates to a method for developing DPM oxidation rate data representing the rate at which DPM in diesel engine exhaust gas is being oxidized during passage through an exhaust system of a diesel engine that includes a catalyzed diesel particulate filter that treats the exhaust gas. Data that represents parameters useful in determining the concentration of NOX in exhaust gas entering the exhaust system from the engine are repeatedly processed to yield NOX concentration data for NOX concentration in the exhaust gas. The a) NOX concentration data, b) data representing concentration of O2 in the exhaust gas entering the DPF, c) data representing temperature of exhaust gas entering the DPF, and d) data for developing DPM oxidation rate data from NOX concentration data, O2 concentration data, and exhaust gas temperature data, are repeatedly processed to yield values of DPM oxidation rate data representing the rate at which DPM is being oxidized in the exhaust system.

The invention relates to methods and to apparatus embodying the foregoing aspects.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
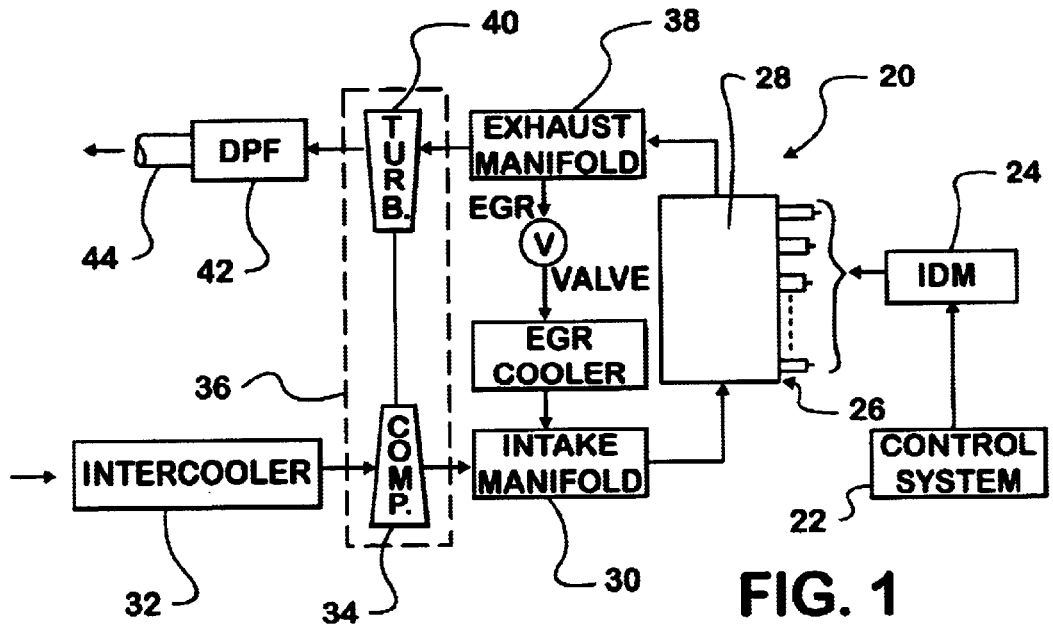
FIG. 1 is a general schematic diagram of an exemplary diesel engine having a control system for forcing regeneration of a DPF in the exhaust system in accordance with principles of the present invention.

FIG. 1 shows a schematic diagram of an exemplary diesel engine 20 for powering a motor vehicle. Engine 20 has a processor-based engine control system 22 that processes data from various sources to develop various control data for controlling various aspects of engine operation. The data processed by control system 22 may originate at external sources, such as sensors, and/or be generated internally.

Control system 22 includes an injector driver module 24 for controlling the operation of electric-actuated fuel injectors 26 that inject fuel into combustion chambers in the engine cylinder block 28. A respective fuel injector 26 is associated with each cylinder and comprises a body that is mounted on the engine and has a nozzle through which fuel is injected into the corresponding engine cylinder. A processor of engine control system 22 can process data sufficiently fast to calculate, in real time, the timing and duration of injector actuation to set both the timing and the amount of fueling.

Engine 20 further comprises an intake system having an intake manifold 30 mounted on block 28. An intercooler 32 and a compressor 34 of a turbocharger 36 are upstream of manifold 30. Compressor 34 draws air through intercooler 32 to create charge air that enters each engine cylinder from manifold 30 via a corresponding intake valve that opens and closes at proper times during engine cycles.

Engine 20 also comprises an exhaust system through which exhaust gases created by combustion within the engine cylinders can pass from the engine to atmosphere. The exhaust system comprises an exhaust manifold 38 mounted on block 28. Exhaust gases pass from each cylinder into manifold 38 via a respective exhaust valve that opens and closes at proper times during engine cycles.

Turbocharging of engine 20 is accomplished by turbocharger 36 that further comprises a turbine 40 associated with the exhaust system and coupled via a shaft to compressor 34. Hot exhaust gases acting on turbine 40 cause the turbine to operate compressor 34 to develop the charge air that provides boost for engine 20.

Figure 2:
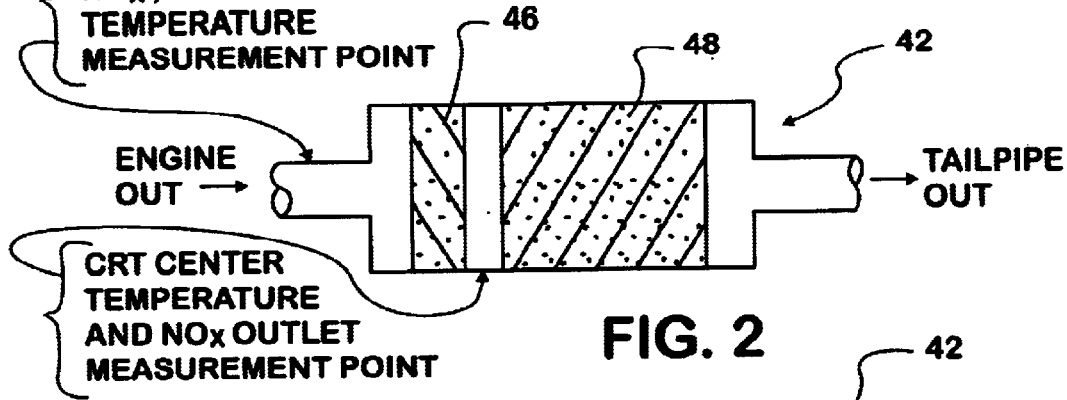
FIG. 2 is a semi-schematic drawing of one type of DPF.

The exhaust system further comprises a DPF 42 downstream of turbine 40 for treating exhaust gas before it passes into the atmosphere through an exhaust pipe 44. The DPF shown in FIG. 2 is representative of the "Continuously Regenerating Trap" or (CRT™) described earlier. It comprises an oxidation catalyst 46 disposed upstream of a non-catalyzed DPF 48. DPF 48 physically traps a high percentage of DPM in exhaust gas passing through it, preventing the trapped DPM from passing into the atmosphere. Oxidation catalyst 46 oxidizes hydrocarbons (HC) in the incoming exhaust gas to CO2 and H2O and converts NO to NO2. The NO2 is then used to reduce the carbon particulates trapped in DPF 48.

Figure 3:
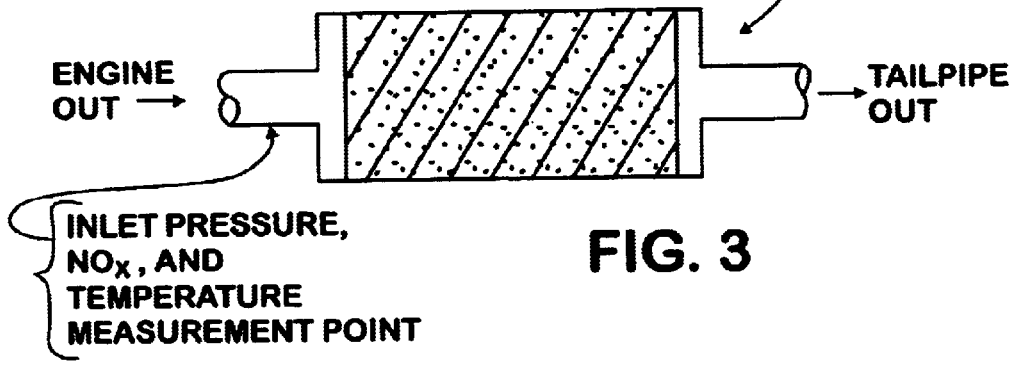
FIG. 3 is a semi-schematic drawing of another type of DPF.

The DPF shown in FIG. 3 is representative of the DPX™ DPF (or CSF) described earlier, having an additional CeO2 catalyst that makes it less dependent on NO2 for oxidizing trapped particulates. It has a single substrate 50 that combines an oxidation catalyst with a trap, thereby eliminating the need for a separate upstream oxidation catalyst as in the DPF shown in FIG. 2. As exhaust gases are passing through substrate 50, DPM is being trapped, and the oxidation catalyst is oxidizing hydrocarbons (HC) and converting NO to NO2, with the NO2 being used to oxidize the trapped carbon.

Figure 4:
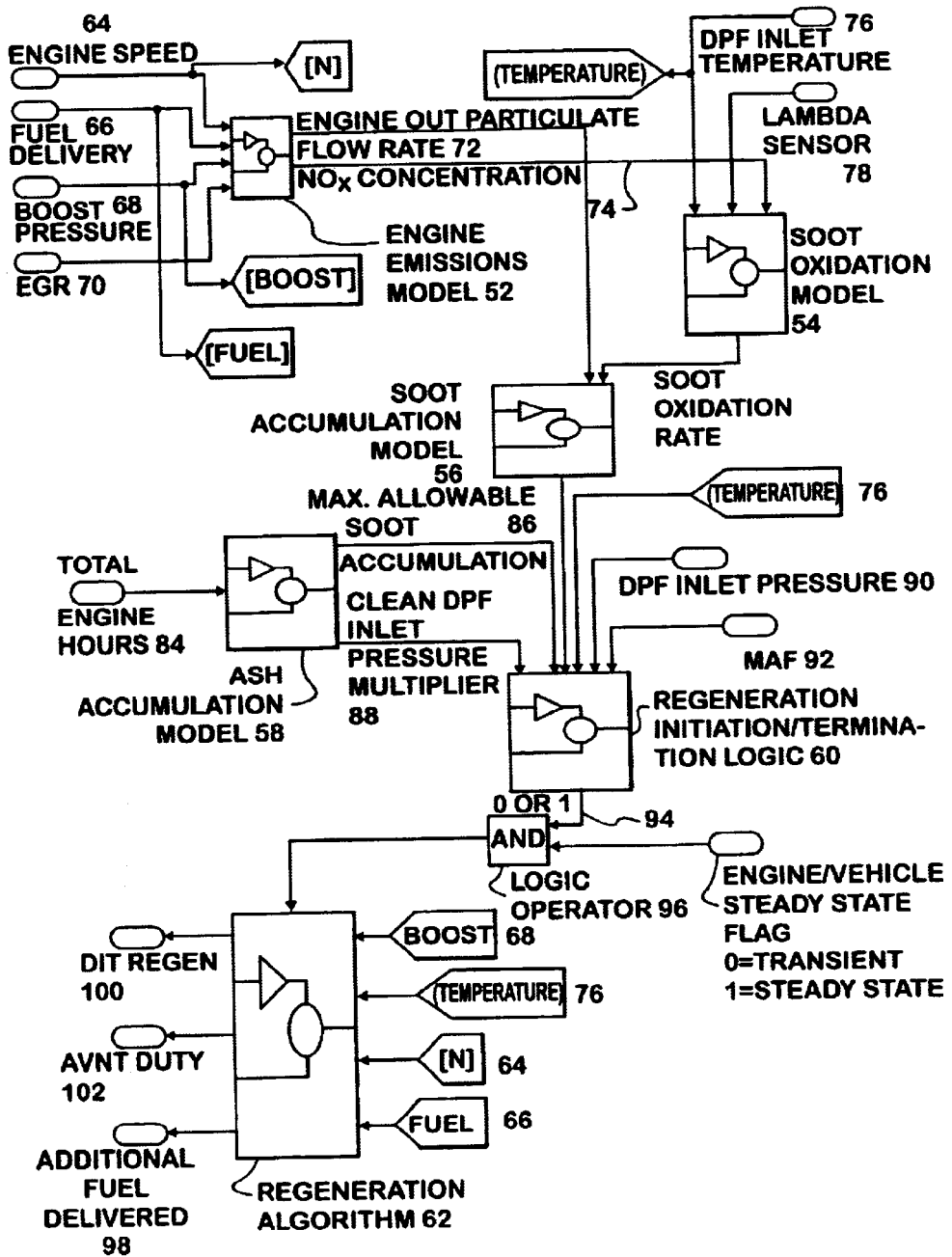
FIG. 4 is a schematic diagram, incorporating both hardware and software elements and symbolism, of an exemplary implementation of the inventive forced regeneration strategy in an electronic engine control comprising a processor that processes data in execution of the strategy.

FIG. 4 shows an exemplary implementation of the inventive forced regeneration strategy in engine 20 for forcing regeneration of DPF 42. Control system 22 processes data in execution of the strategy to provide control of both timing and duration of forced regeneration. The overall strategy may be viewed as a hybrid of model-based and closed-loop control strategies. The complete strategy is made robust by a certain redundancy that is built into the system, as will be explained later.

FIG. 4 shows four models: an Engine Emissions Model 52; a DPM Oxidation Model 54; a DPM Accumulation Model 56; and an Ash Accumulation Model 58. It further comprises Regeneration Initiation/Termination Logic 60 and a Regeneration Algorithm 62.

In a basic form, Engine Emissions Model 52 can be based on steady state emission rates. A look-up table is created from empirical data to yield a particulate mass flow rate as a function of engine speed and engine fueling. Such a basic form has an advantage of simplicity, but its accuracy during engine transients may be problematic. It also lacks ability to account for altitude effects. A more complex, but perhaps better, approach employs a neural network-based model that can run in real time to accurately model dynamics (i.e. engine transients) and account for altitude effects by measuring boost directly.

Data processed by Engine Emissions Model 52 comprises engine speed 64, engine fueling 66, turbocharger boost 68, and EGR 70. Data developed by engine emissions model 52 from that processing comprises DPM mass flow rate 72 and NOX concentration 74. Data that represents the NOX concentration is developed in any suitably appropriate manner, recognizing that the ability to actually sense NO2 is problematic.

DPM Oxidation Model 54 is an equation-based model that captures the global chemical kinetics of the carbon particulate oxidation in DPF 42. Variables used in the equation are temperature of exhaust gas entering DPF 42, data representing NOX concentration in the exhaust gas, and O2 concentration in the exhaust gas. The exhaust gas temperature is directly measured by a suitable sensor to provide exhaust gas temperature data 76. As explained above, Engine Emissions Model 52 furnishes NOX concentration data 74. A wide-range Lambda sensor, i.e. an O2 sensor, provides O2 concentration data 78.

Direct measurement of exhaust gas temperature is believed to provide a significant advantage over modeling temperature as a function of engine speed and fuel delivery. Specifically, direct measurement of temperature can compensate for ambient temperature effects. In cold weather for example, exhaust gas temperature would be different from that measured in a laboratory environment at the same speed and load conditions due to the increased heat losses from the exhaust system.

DPM Oxidation Model 54 has the advantage of accounting for any natural regeneration that may occur in the DPF so that initiation of unnecessary forced regeneration can be avoided. A control strategy that seeks to estimate DPM accumulation without accounting for natural regeneration as model 54 inherently does may initiate unnecessary forced regenerations. The data processed through Model 54 yields data 80 representing a rate at which DPM is being oxidized within DPF 42.

DPM Accumulation Model 56 processes DPM mass flow rate data 72 from Engine Emissions Model 52 and DPM oxidation rate data from DPM Oxidation Model 74 to yield data representing net DPM accumulation rate in DPF 42 and integrates that rate to yield data 82 representing net DPM accumulation in DPF 42. Model 56 will be explained in greater detail in conjunction with description of FIG. 10 later on.

Ash Accumulation Model 58 accounts for ash build-up within DPF 42. Specifically, as DPF 42 ages, ash accumulates internally, and that accumulation reduces the maximum amount of DPM that DPF 42 can trap. Model 58 uses a measurement of accumulated engine running time 84 to yield data representing ash accumulation in the filter. As accumulated engine running time increases, Model 58 lowers the value of data 86 representing a maximum allowable DPM accumulation in DPF 42.

Regeneration Initiation/Termination Logic 60 acts on that data 86, with the overall effect of causing forced regenerations to occur more frequently as accumulated engine running time increases. Model 58 also develops data 88 that Logic 60 uses to adjust limits of certain parameters so that a forced regeneration is neither unnecessarily initiated nor unnecessarily prolonged.

Regeneration Initiation/Termination Logic 60 determines whether or not to initiate a forced regeneration, and it also determines when to discontinue forced regeneration. In making those determinations, it processes data that includes data 76, 82, 86, and 88. It also processes data 90 representing pressure at the inlet of DPF 42 and data 92 representing mass flow through DPF 42. Data 90 may be obtained from a suitable pressure sensor in the exhaust system, mounted on or proximate DPF 42. Data 92 may be derived using data from an engine MAF sensor that measures mass airflow into engine 20.

Briefly, Regeneration Initiation/Termination Logic 60 compares the value of net accumulated DPM against a maximum allowable level. If the net accumulation is greater than the maximum allowable, the strategy initiates a forced regeneration. When the net DPM accumulation falls below a "clean" level of DPM accumulation, forced regeneration is discontinued.

Regeneration Initiation/Termination Logic 60 includes redundancy for initiating/terminating forced regeneration, using DPF inlet temperature data 76, pressure data 90, and mass flow rate data 92. The redundancy will be explained later in conjunction with detailed description of FIG. 11.

Regeneration Algorithm 62 interfaces regeneration initiation/termination logic 60 with certain aspects of control performed by control system 22 in control of engine fueling and turbocharger operation. Algorithm 62 initiates or terminates a regeneration cycle as called for by Logic 60. It also terminates a regeneration cycle when called for by a transient interrupt.

A data output 94 of Logic 60 is set to a logic "1" when Logic 60 calls for DPF regeneration and to logic "0" when Logic 60 does not call for regeneration. An AND logical operator 96 interfaces Logic 60 with Algorithm 62. Data output 94 is one input to operator 96, and a data output 98 from an engine/vehicle steady state flag is another input to operator 98. A logic "1" for data output 98 signals steady state engine/vehicle operation while a logic "0" signals a transient. With a steady state operating condition of the vehicle and engine being indicated, such as cruising at highway speed, Algorithm 62 will therefore execute whenever data output 94 is a logic "1" and not execute when data output 94 is a logic "0". If an engine/vehicle transient occurs while Algorithm 62 is executing, the change in data output 98 from a logic "1" to a logic "0" interrupts execution of the algorithm. Execution of the algorithm resumes when the transient ceases.

Algorithm 62 processes boost data 68, temperature data 76, engine speed data 64, and engine fueling data 70 to develop values for adjusted fueling data 98 that are used for fueling the engine, values for adjusted timing data 100 that are used for the timing of engine fueling, and values for turbocharger control data 102 to regulate turbocharger boost so as to counteract any effect of elevated exhaust gas temperature on turbocharger operation.

With an overall description of FIG. 4 having been given, attention can now be focused on further details of certain of its individual elements.

Figure 5:
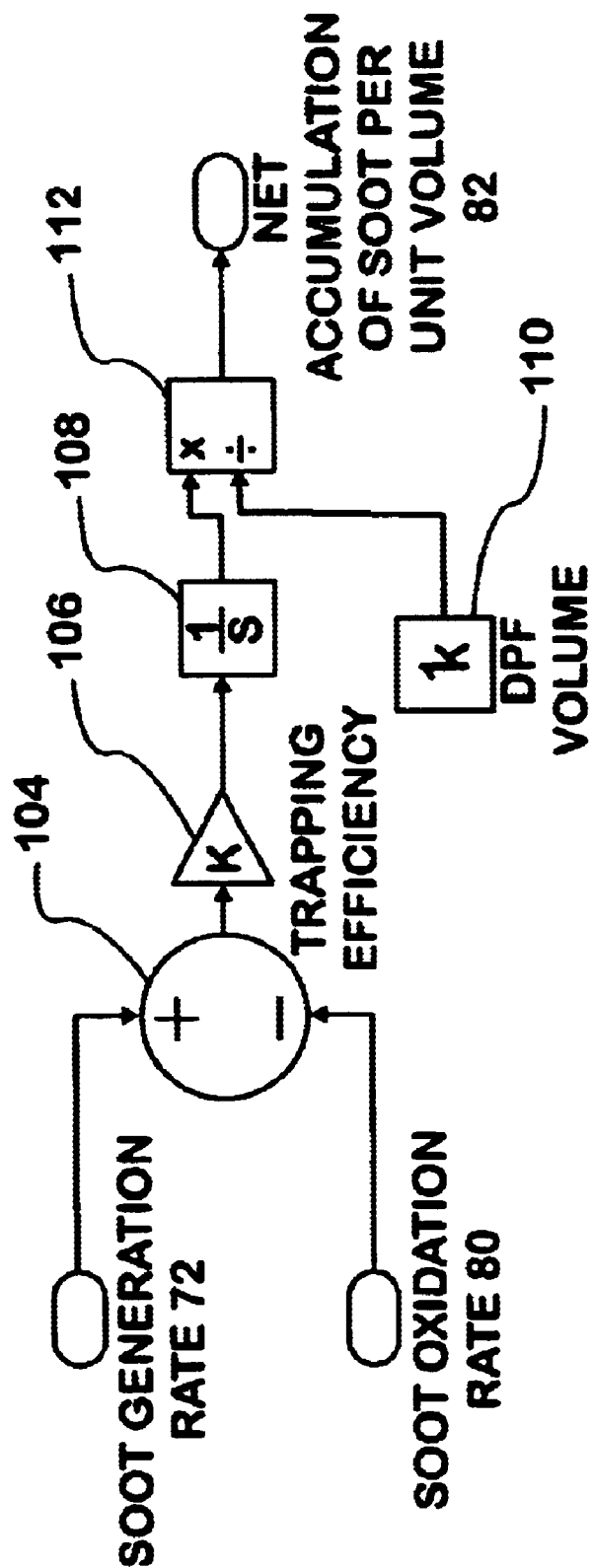
FIG. 5 is a more detailed diagram of one of the elements of FIG. 4.

FIG. 5 discloses detail of DPM Accumulation Model 56. The Model repeatedly processes DPM mass flow rate data 72 and DPM oxidation rate data 80 by taking their difference during execution of a step 104. The model also contains data K representing a value for the DPM trapping efficiency of DPF 42. The difference between DPM mass flow rate data 72 and DPM oxidation rate data 80 is multiplied by the trapping efficiency K during execution of a step 106, and that result is integrated during a step 108.

Model 56 also contains a store 110 for data k representing a value for the effective volume of DPF 42. A product operation 112 is performed on the data from step 108 and the value of k to yield a result representing net DPM accumulation per unit volume of DPF 42. This result is the data 82 representing net DPM accumulation in DPF 42.

Figure 6:
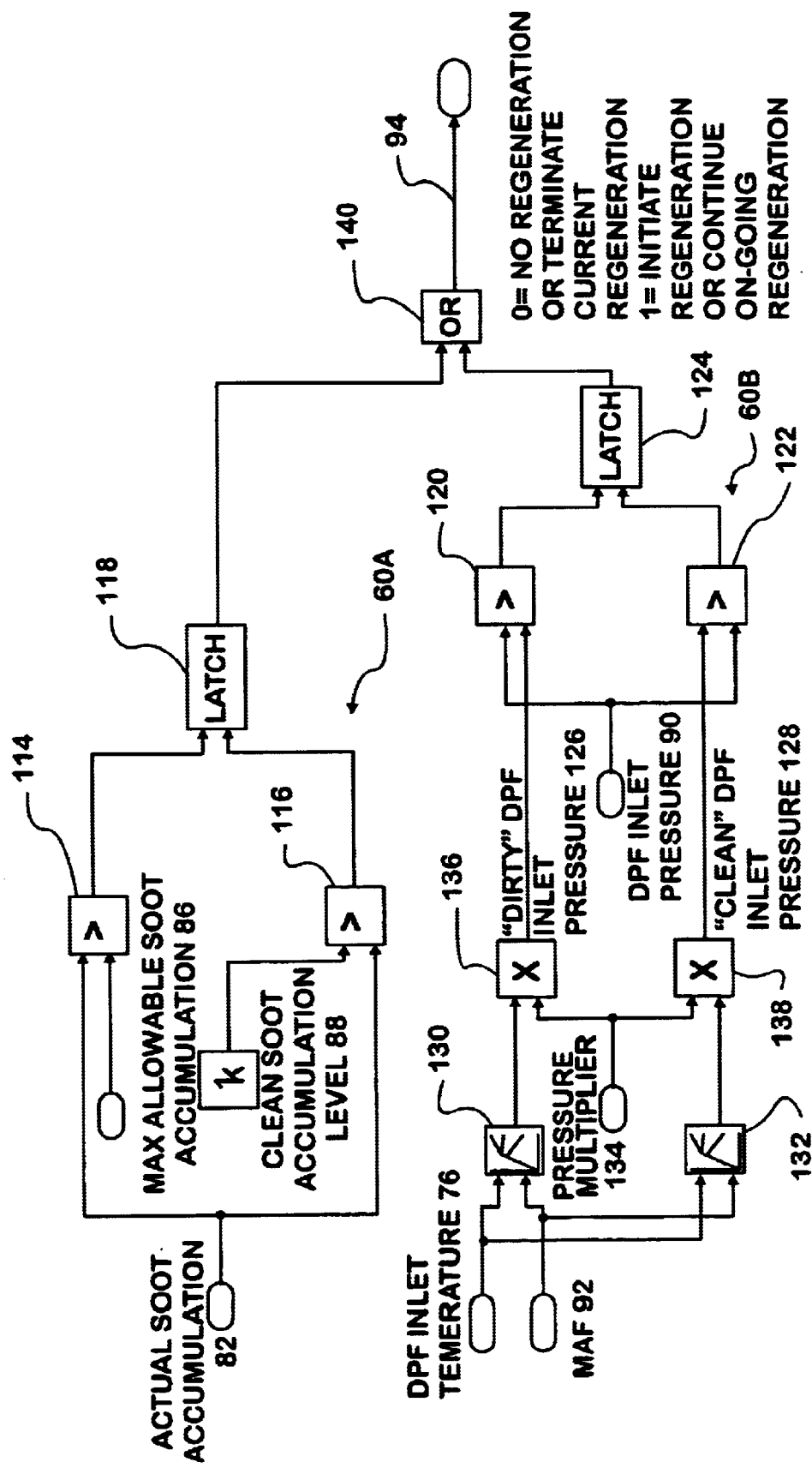
FIG. 6 is a more detailed diagram of another of the elements of FIG. 4.

FIG. 6 discloses detail of Regeneration Initiation/Termination Logic 60. The redundancy that was mentioned earlier is provided by two distinct logic sections 60A and 60B. Section 60A utilizes data 86 representing a maximum allowable DPM accumulation in DPF 42, net DPM accumulation data 82, and data 88 representing a "clean" level of DPM accumulation in DPF 42. A rational operator 114 processes net DPM accumulation data 82 and maximum allowable DPM accumulation data 86, and a rational operator 116 processes net DPM accumulation data 82 and "clean" level DPM accumulation data 88. Operator 114 is effective to set a latch 118 when net DPM accumulation data 82 is greater than maximum allowable DPM accumulation data 86. Operator 116 is effective to reset latch 118 when net DPM accumulation data 82 is less than "clean" level DPM accumulation data 88.

Section 60B comprises rational operators 120, 122 and a latch 124 operatively related in the same manner as their counterparts in section 60A. Operators 120, 122 use DPF inlet pressure data 90 instead of net DPM accumulation data 82. Operator 120 processes DPF inlet pressure data 90 and data 126 representing a pressure value indicative of DPF inlet pressure when the DPF is "dirty", meaning needing regeneration. Operator 122 processes DPF inlet pressure data 90 and data 128 representing a pressure value indicative of DPF inlet pressure when the DPF is "clean", meaning not needing regeneration. Operator 120 is effective to set latch 124 when DPF inlet pressure data 90 is greater than "dirty" DPF inlet pressure data 126. Operator 122 is effective to reset latch 124 when DPF inlet pressure data 90 is less than "clean" DPF inlet pressure data 128.

Values for "dirty" DPF inlet pressure data 126 and for "clean" DPF inlet pressure data 128 are derived by logic 60 processing data 76 representing temperature of exhaust gas entering DPF 42 and mass flow data 92 through respective look-up tables 130, 132. The result from each look-up table is multiplied by a pressure multiplier 134 using a respective operator 136, 138.

Data for look-up table 130 is developed by mapping inlet pressure of a "dirty" (i.e. fully or partially loaded) DPF as a function of mass airflow rate and DPF inlet temperature. Data for look-up table 132 is developed by mapping inlet pressure of a "clean" but properly aged DPF as a function of mass airflow rate through the engine and DPF inlet temperature. When DPF inlet pressure exceeds that for a "dirty" DPF, then a forced regeneration is initiated. When the inlet pressure drops below that for a "clean" DPF, then the regeneration is terminated.

By constructing the model in this way to be engine independent, it accounts for heat transfer effects because temperature is directly measured. Specifically, at the same mass flow rate, a different DPF inlet pressure is measured for different inlet temperatures. In other words, use of temperature as a parameter allows compensation for changes in density due to heat transfer. A model based only on engine speed and fueling would not have such a capability.

Redundancy provided by having the two sections 60A, 60B is seen desirable to assure regeneration if the event of a failure or error in one of the two sections 60A, 60B, due to any of several reasons that include data processing and defective sensors. The outputs of the two latches 118, 124 form inputs to an OR logical operator 140. Whenever either latch is set, it is effective to cause data output 94 to be a logic "1", and hence command regeneration.

Figure 7:
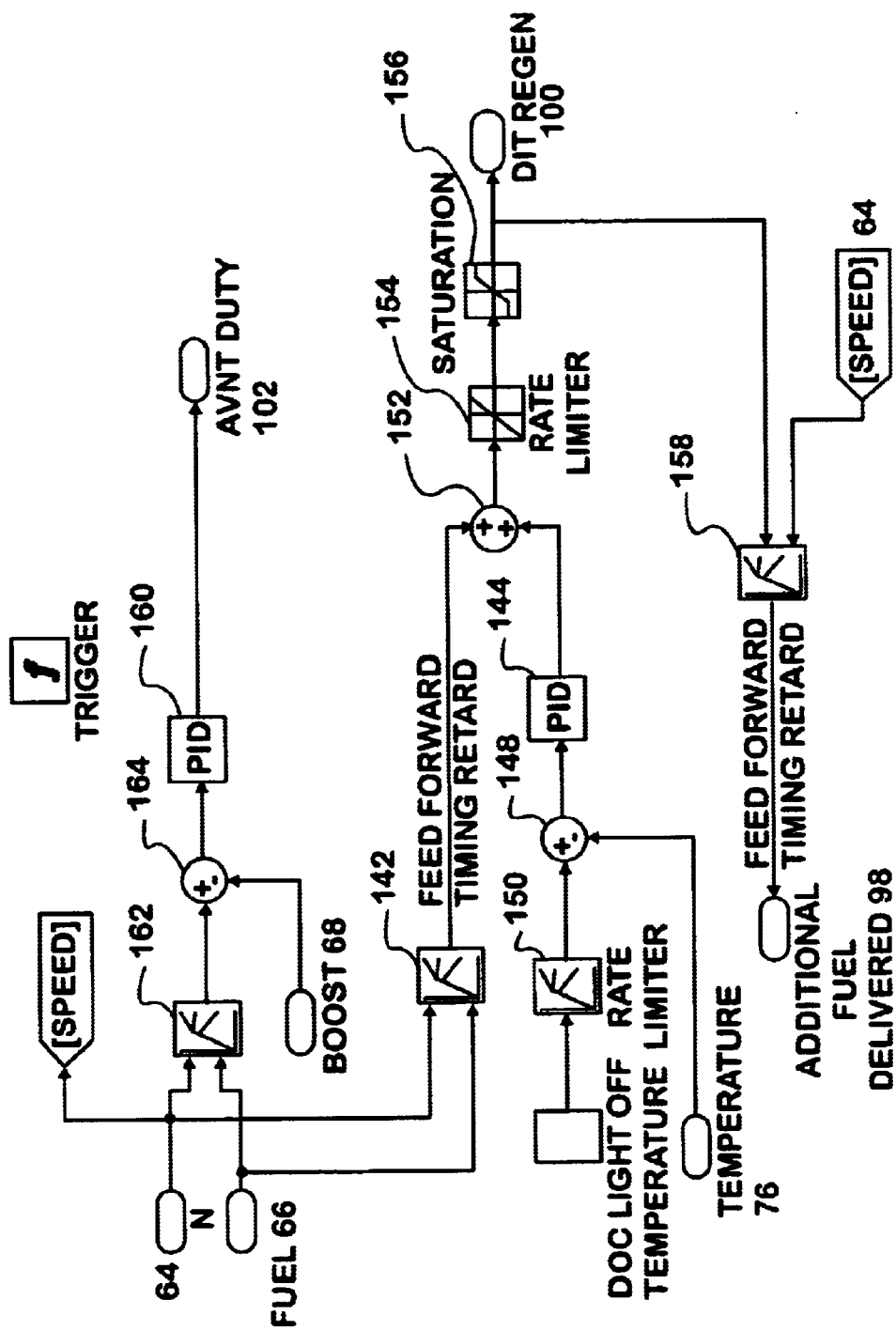
FIG. 7 is a more detailed diagram of still another of the elements of FIG. 4.

As discussed earlier, a preferred method for elevating exhaust gas temperature to perform regeneration comprises retarding the timing of main fuel injections. The disclosed strategy for accomplishing this via Algorithm 62 comprises three sections that appear in FIG. 7.

A first section comprises a look-up table 142 containing values of absolute timing of main fuel injection during regeneration as a function of values of engine speed and "baseline" engine fueling, i.e. the amount of engine fueling immediately before regeneration is initiated. Table 142 is used as a feed forward table in conjunction with a P-I-D controller 144.

Controller 144 processes an error signal that is developed by the feedback of data 76 representing temperature at the inlet of DPF 42. During a step 148, the value of data 76 is subtracted from the value of data representing a rate-limited value of DPF "light off" temperature to adjust the timing of engine fuel as necessary to achieve catalyst "light off". The "light off" temperature is rate-limited by a rate limiter 150 to model the amount of time by which attainment of catalyst "light off" is delayed from the initiation of a forced regeneration cycle. This feature prevents excessive retarding of the timing of main fuel injections prior to "light off". Generally speaking, the lower the engine speed and the smaller the engine load, the longer the delay time.

The output of table 142 and the output of controller 144 are summed during a step 152, and the result is rate-limited by a rate limiter 154. This causes the retarding of engine fueling to occur gradually rather than all at once and should aid in making the regeneration process transparent to the driver. Retarding is limited both maximally and minimally by executing a step 156 before allowing the actual rate-limited value to be used.

The second section includes another look-up table 158 for the additional fuel delivery that is required during regeneration in order to overcome combustion efficiency losses due to the retarding of injection timing. Table 158 also aids in making regeneration transparent to the driver. It adds additional fuel as the timing of fueling changes, striving to maintain engine torque and vehicle speed. Table 158 maps additional fuel values as a function of the relative amount of timing retard and engine speed. In general, the more that timing is retarded, the more that additional fuel is added.

The third section comprises a P-I-D controller 160 for holding turbocharger boost at a baseline value during regeneration. As the exhaust gas temperature rises, turbocharger speed typically increases due to the increased energy of the exhaust flow. This in turn increases boost and slows the rate at which the exhaust gas temperature increases. Keeping boost pressure at the baseline level minimizes this effect, making the retarded timing of fueling more efficient.

Fueling data 66 and engine speed data 64 are inputs to a boost look-up table 162. Data 68 representing actual turbocharger boost is subtracted from a value from the look-up table corresponding to data 64 and data 66 to create an error signal via a step 164. The error signal is processed by controller 164 to accomplish regulation of boost using actual boost as feedback.

As described earlier, a strategy for handling engine/vehicle transients is included as part of the overall strategy with the intent of counteracting undesired effects of the regeneration strategy on vehicle driveability during such transients. Because forced regeneration is preferably initiated only during vehicle cruising conditions (i.e. steady state driving), interruption of cruising by certain accelerations and/or decelerations, will cause the strategy to default temporarily back to baseline values during such transients, and to once again resume after the transients have subsided.

While the strategy may therefore seek to accomplish the intent of avoiding undesired effects of forced regeneration, the very nature of the regeneration process tends to sustain the process for at least some significant amount of time after a transient-initiated default begins.

The recognition of retarding the timing of engine fueling as a preferred method for elevating exhaust gas temperature to a temperature suitable for DPF regeneration resulted from the investigation of several different methods using a 1998 7.3L International® PowerStroke engine. Those methods were: 1) increasing exhaust back-pressure; 2) decreasing turbocharger boost; and 3) retarding the start of the main fuel injection. The engine had been retrofitted with an Advanced Variable Nozzle Turbine (AVNT) turbocharger and a high-pressure loop EGR system. The engine fuel system and actuators were controlled using a "dSpace" micro-controller, which provided the flexibility needed to develop and test the three methods. The engine was operated mainly at low speed and load conditions, in as much as the DPF would regenerate naturally at high speed and load conditions. Locations for placement of specific instrumentation are shown in FIGS. 2 and 3 for the two respective DPF's.

The first method (increasing exhaust back-pressure) at a given engine speed and load created a corresponding increase in engine pumping loss that had to be offset by an increase in the fuel delivery in order to maintain the same engine speed and load. This elevated in-cylinder combustion temperature and exhaust gas temperature. It was hoped that the exhaust gas temperature could be increased sufficiently to initiate a forced regeneration of the DPF.

Figure 8:
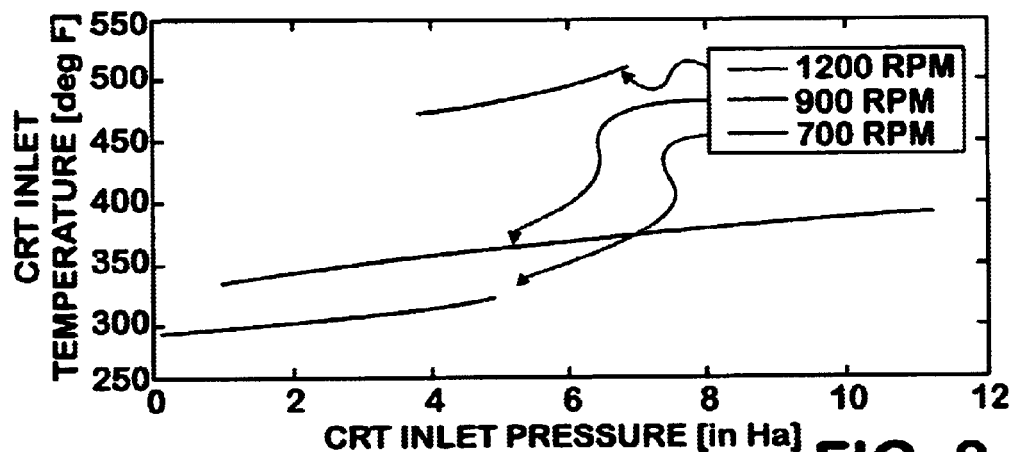
FIGS. 8–10 are graph plots comparing effectiveness of three different methods for initiating regeneration.

FIG. 8 shows exhaust gas temperature at the inlet of the DPF of FIG. 2 as a function of engine back-pressure. The data was obtained at three engine speeds: 725 rpm (revolutions per minute) at 70 ft-lbs (foot-pounds) torque, 900 rpm at 90 ft-lbs, and 1200 rpm at 100 ft-lbs. Each case represents approximately 25% of peak load. The oxidation catalyst was 9" in dia.×6" long and had 400 cells per square inch (cpsi) with a platinum loading of approximately 80–120 g/ft3. The filter portion 48 was 9" in diameter by 12" long with 100 cpsi.

The exhaust back-pressure was varied by using an exhaust restriction valve installed in an engine test cell. At a given speed and load condition the restriction valve was systematically incremented from a baseline position to about 95% fully closed. Fuel delivery was adjusted to maintain speed and load. For this particular DPF, the BPT ranges from about 536° F. to about 626° F. (280° C.–330° C.) FIG. 8 shows that increasing the exhaust back-pressure did not adequately raise the exhaust gas temperature, suggesting that this method is unlikely to be very suitable for initiation of a forced regeneration, especially at low speed and low load conditions.

The second method (controlling turbocharger boost) could also raise the exhaust gas temperature. Specifically, lowering boost while maintaining fuel delivery (or engine load) provides less mass of air in each engine cylinder per combustion event. This lowers the thermal inertia of the charge in the cylinder, making it easier to raise the in-cylinder combustion temperature. This method was implemented using the AVNT/EGR system.

Figure 9:
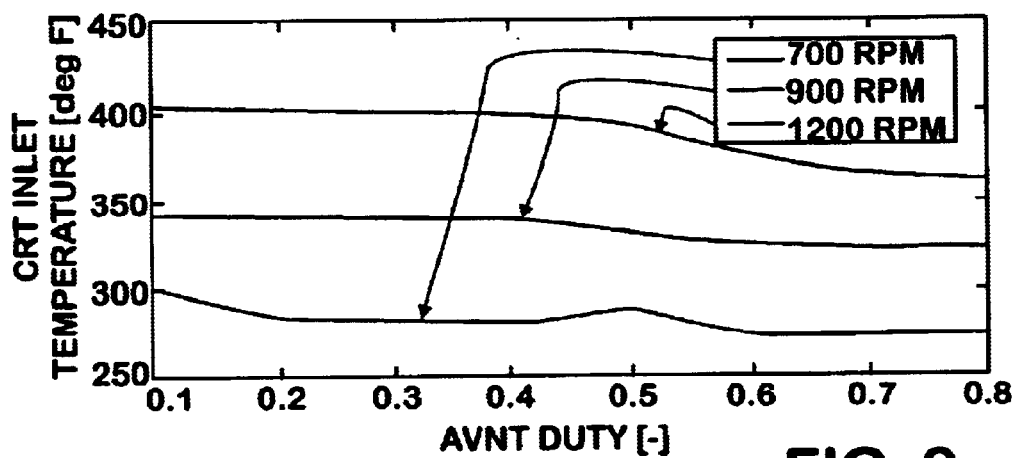

Decreasing the duty cycle of a control signal applied to the turbocharger while keeping the EGR valve open lowered boost and had the effect of raising the exhaust gas temperature as described above. FIG. 9 shows the temperature of exhaust gas at the DPF inlet as a function of the duty cycle signal. The data shown is for the same engine conditions as FIG. 8. Boost control through the AVNT/EGR system did raise exhaust gas temperature as expected, but insufficiently to initiate a forced regeneration, in as much as none of the inlet temperatures was greater than the BPT. The results suggest that this method also is unlikely to be suitable for initiation of a forced regeneration Two significant events occurred when employing the third method (retarding the timing of the main injection).

First, the start of injection (SOI) was delayed to a crank angle where combustion was less efficient, effectively lowering the indicated torque produced by the engine. That result can also be viewed as an apparent increase in braking torque applied to the engine. In fact, if the apparent increase in engine load is not compensated by increased fuel delivery, the engine will loose speed, and likely lower vehicle speed as well. When that torque loss is compensated by increasing engine fueling, the in-cylinder combustion temperature increases, likewise increasing exhaust gas temperature. The result is similar to that obtained by increasing exhaust back-pressure.

Second, the inefficient combustion leaves unburned gaseous HC in the exhaust stream. If the exhaust gas temperature can be raised not to the BPT, but to the oxidation catalyst's "light off" temperature, the excess HC can be oxidized over the catalyst, with the resulting heat release having potential for further elevating the exhaust gas temperature to temperatures well above the BPT. This would very likely initiate a forced regeneration of the DPF.

Figure 10:
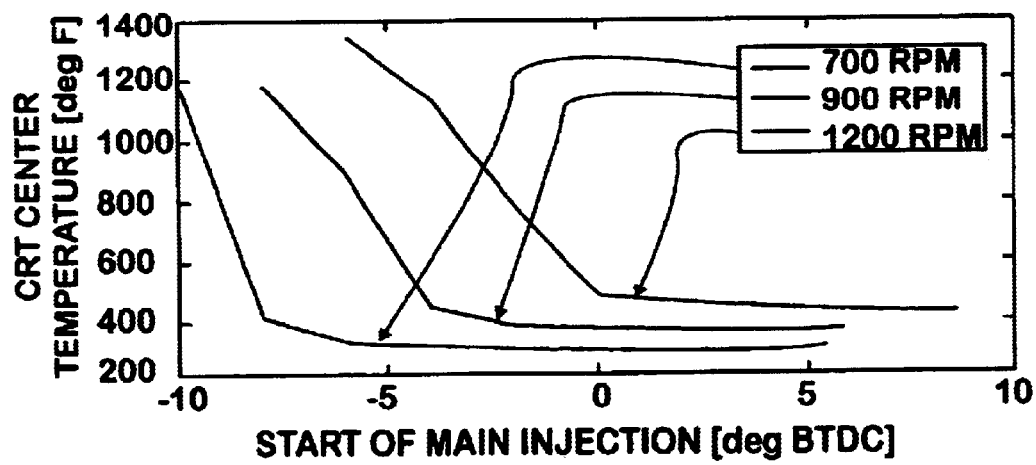

FIG. 10 shows the exhaust gas temperature downstream of oxidation catalyst 46 (CRT center temperature in FIG. 2) as a function of the start of main injection. The temperature data were obtained for the same engine speed and load conditions as in FIG. 8. It becomes evident from FIG. 10 that retarding the timing of engine fueling has the potential for initiating forced regeneration of the DPF at low engine speeds and loads. In fact, the temperature of the exhaust gas entering DPF portion 48 of the DPF 42 of FIG. 2 is in excess of 1100° F. (590° C.), well above the BPT.

Although this third method ostensibly offers the most potential for successful regeneration, it is accompanied by some negative aspects including a BSFC (brake specific fuel consumption) penalty, HC slippage during regeneration start-up, and possible NO2 reduction by the oxidation of HC. These factors will be further discussed later.

The use of any of these three methods for initiating a forced regeneration is premised upon the ability to decrease exhaust back-pressure from that of a partially or fully loaded DPF to that of a clean or unloaded DPF.

Confirmation of the effectiveness of the third method required loading the DPF with DPM. Loaded was accomplished by operating the engine is such a way as to accelerate the rate of DPM accumulation. Specifically, the engine speed and load was held at 1000 rpm and approximately 50 ft-lbs. At that condition the temperature was well below the BPT. Approximately every sixty seconds, the engine was accelerated to full load at constant speed for fifteen seconds while boost was minimized through appropriate AVNT/EGR control, and in some instances even throttling the intake mass airflow rate. This produced a high concentration spike of DPM during the acceleration without significantly raising the exhaust gas temperature. This allowed DPM to accumulate in the DPF without occurrence of any regeneration, natural or otherwise. This process was continued for approximately an hour until the loading reached a point where the DPF caused sufficient exhaust gas back-pressure to develop.

Figure 11:
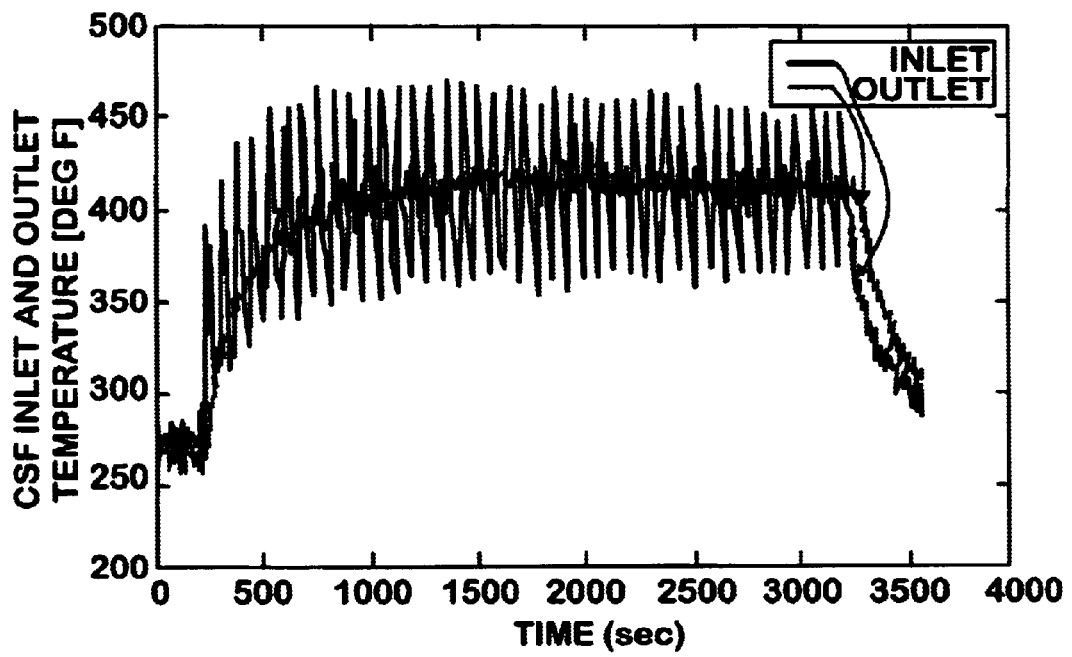
FIGS. 11 and 12 are graph plots related to a test procedure for accumulating DPM in a DPF.
Figure 12:
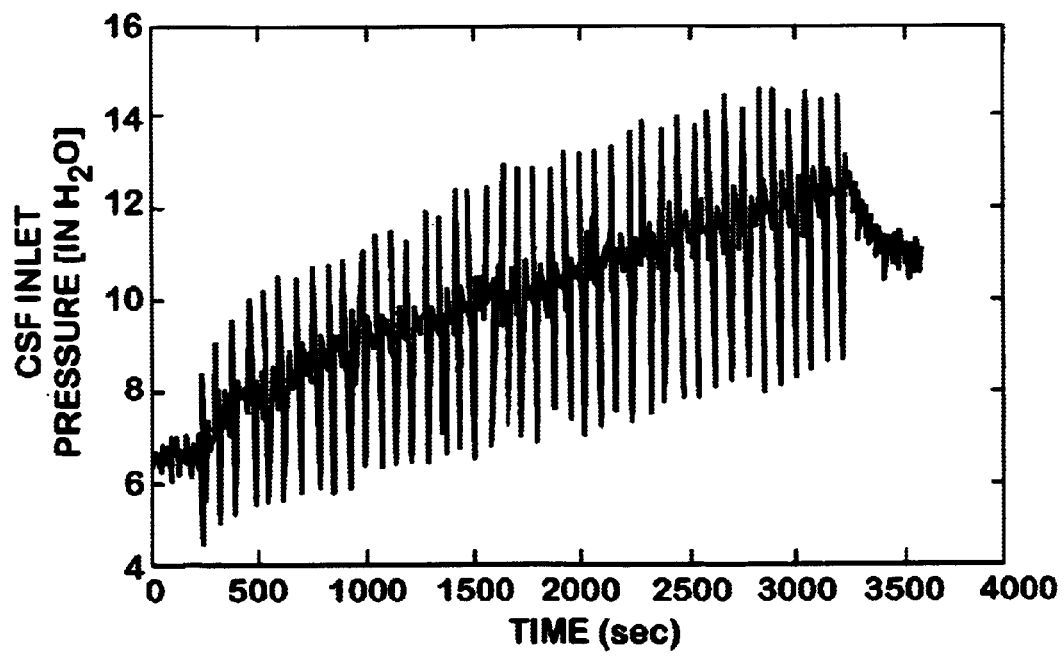

FIGS. 12 and 11 show respective time traces of back-pressure at the DPF inlet and of exhaust gas temperatures at both inlet and outlet of the DPF during a typical DPM accumulation process.

Certain fuel injection strategies employ a pilot injection, followed by a main injection. Principles of the invention may be applied to either or both types of injection in such an injection strategy.

While a presently preferred embodiment of the invention has been illustrated and described, it should be appreciated that principles of the invention apply to all embodiments falling within the scope of the following claims.

What is claimed is:

1. A method of imposing a forced regeneration cycle on a diesel particulate filter that treats exhaust gas passing through an exhaustsystem of a turbocharged diesel engine to force regeneration of the filter, the method comprising:

during engine running time, repeatedly processing data that represents engine speed, data that represents engine fueling, data that represents turbocharger boost, and data that represents exhaust gas recirculation (EGR) from the exhaust system back into the engine, through an engine emissions model to yield values representing rates at which diesel particulate matter (DPM) from the engine is entering the exhaust system and values for $NO_x$ concentration in the exhaust gas;

repeatedly processing the values for $NO_x$ concentration in the exhaust gas, values representing concentration of $O_2$ in the exhaust gas entering the filter, and values representing temperature of exhaust gas entering the filter through a DPM oxidation model to yield values of DPM oxidation rate data representing the rate at which DPM is being oxidized in the exhaust system;

repeatedly processing the values of DPM oxidation rate data and the values representing a rate at which DPM from the engine is entering the exhaust system data through a DPM accumulation model to yield values of net DPM accumulation representing net accumulation of DPM in the filter at various points of time during engine running time;

repeatedly processing accumulated engine running time through an ash accumulation model to yield data representing ash accumulation in the filter;

repeatedly processing the values of net DPM accumulation and the data representing ash accumulation in the filter through regeneration initiating/terminating logic for commanding a forced regeneration cycle when a result of the latter processing calls for initiation of forced regeneration of the filter and for discontinuing the forced regeneration cycle when a subsequent result calls for termination of the forced regeneration cycle.

2. A method as set forth in claim 1 in which the step of repeatedly processing the values of DPM oxidation rate data and the values representing a rate at which DPM from the engine is entering the exhaust system data through a DPM accumulation model to yield values of net DPM accumulation representing net accumulation of DPM in the filter at various points of time during engine running time further comprises:

also processing data representing DPM trapping efficiency of the filter and data representing effective geometric size of DPM trapping medium in the filter to yield values representing net DPM trapped in the filter per unit of geometric size of the DPM trapping medium.

3. A method as set forth in claim 2 in which the step of repeatedly processing the values of net DPM accumulation and the data representing ash accumulation in the filter through regeneration initiating/terminating logic for commanding a forced regeneration cycle when of a result of the latter processing calls for initiation of forced regeneration of the filter and for discontinuing the forced regeneration cycle when a subsequent result calls for termination of the forced regeneration cycle comprises:

processing the values representing DPM trapped in the filter per unit of geometric size of the DPM trapping medium and data distinguishing values of DPM trapped in the filter per unit of geometric size of the DPM trapping medium that call for forced regeneration of the filter from those that do not call for forced regeneration; and when a result of the latter processing discloses that a value of data representing DPM trapped in the filter per unit of geometric size of the DPM trapping medium calls for regeneration of the filter, operating the engine in an elevated temperature mode of operation that elevates the exhaust gas temperature to a temperature for forcing regeneration of the filter, and when a subsequent result discloses that a value of data representing DPM trapped in the filter per unit of geometric size of the DPM trapping medium does not call for regeneration of the filter, discontinuing operation of the engine in the elevated temperature mode of operation.

4. A method as set forth in claim 1 including executing a forced regeneration cycle in consequence of a command for a forced regeneration cycle, wherein the forced regeneration cycle comprises:

providing engine fueling data representing engine fueling in the absence of forced regeneration of the filter;

as the forced regeneration cycle progresses, repeatedly processing both baseline engine fueling data representing engine fueling at commencement of the forced regeneration cycle and engine speed data that represents engine speed according to a map that correlates values representing various timings for engine fueling during the forced regeneration cycle with both values of baseline engine fueling and values of engine speed to yield timing values for the timing of engine fueling as the forced regeneration cycle progresses;

processing data representing light off temperature of catalytic material of the filter and data representing actual temperature of the catalytic material, as the forced regeneration cycle progresses, to yield adjustment values for adjusting the timing values;

processing the adjustment values and the timing values to yield adjusted timing values for the timing of engine fueling during the forced regeneration cycle;

processing the adjusted timing values and the engine speed data according to a map that correlates fueling modification values with both the adjusted timing values and values of engine speed to yield fueling modification values;

processing the engine fueling data and the fueling modification values to yield adjusted fueling values;

using the adjusted fueling values instead of the engine fueling data for fueling the engine during the forced regeneration cycle; and using the adjusted timing values for the timing of engine fueling during the forced regeneration cycle.

5. A method as set forth in claim 1 including the further steps of:

executing a forced regeneration cycle in consequence of a command for a forced regeneration cycle, wherein the forced regeneration cycle comprises elevating the exhaust gas temperature to a temperature for forcing regeneration of the filter; and during elevation of the exhaust gas temperature, regulating boost of a turbocharger that is powered by engine exhaust gas to deliver charge air to the engine to counteract the full effect of the elevation of exhaust gas temperature on turbocharger boost.

6. A method of imposing a forced regeneration cycle on a diesel particulate filter that treats exhaust gas passing through an exhaust system of a diesel engine to force regeneration of the filter, the method comprising:

providing engine fueling data representing engine fueling in the absence of forced regeneration of the filter;

during engine running time, repeatedly processing data that represents parameters useful in determining a rate at which diesel particulate matter (DPM) is accumulating in the filter through a DPM accumulation model to yield values of DPM accumulation representing accumulation of DPM in the filter at various points of time during engine running time;

processing the values of DPM accumulation and data that distinguishes DPM accumulation values calling for forced regeneration of the filter from those not calling for forced regeneration of the filter;

when a result of the latter processing discloses that a DPM accumulation value calls for forced regeneration of the filter, initiating forced regeneration by retarding the timing of engine fueling to elevate the exhaust gas temperature to a temperature for forcing regeneration of the filter;

as the forced regeneration cycle progresses, repeatedly processing baseline engine fueling data representing engine fueling at commencement of the forced regeneration cycle, engine speed data that represents engine speed, data representing light off temperature of catalytic material of the filter, and data representing actual temperature of the catalytic material, to yield adjusted timing values for timing of engine fueling and fueling modification values;

processing the engine fueling data and the fueling modification values to yield adjusted fueling values;

using the adjusted fueling values instead of the engine fueling data for fueling the engine during the forced regeneration cycle; and using the adjusted timing values for the timing of engine fueling during the forced regeneration cycle.

7. A method of imposing a forced regeneration cycle on a diesel particulate filter that treats exhaust gas passing through an exhaust system of a diesel engine to force regeneration of the filter, the method comprising:

providing engine fueling data representing engine fueling in the absence of forced regeneration of the filter;

during engine running time, repeatedly processing data that represents temperature of exhaust gas entering the filter, data that represents exhaust gas flow entering the filter, and data that utilizes both exhaust gas temperature and flow to distinguish a filter that has trapped an amount of diesel particulate matter (DPM) calling for forced regeneration from a filter that does not call for forced regeneration to yield result data that a) calls for forced regeneration of the filter when the data that represents temperature of exhaust gas entering the filter and the data that represents exhaust gas flow entering the filter disclose that the filter has trapped an amount of DPM calling for forced regeneration, and b) calls for no forced regeneration when the data that represents temperature of exhaust gas entering the filter and the data that represents exhaust gas flow entering the filter disclose that the filter does not call for regeneration;

when the result data calls for forced regeneration of the filter, initiating forced regeneration by retarding the timing of engine fueling to elevate the exhaust gas temperature to a temperature for forcing regeneration of the filter;

as the forced regeneration cycle progresses, repeatedly processing, baseline engine fueling data representing engine fueling at commencement of the forced regeneration cycle, engine speed data that represents engine speed, data representing light off temperature of catalytic material of the filter, and data representing actual temperature of the catalytic material, to yield adjusted timing values for timing of engine fueling and fueling modification values;

processing the engine fueling data and the fueling modification values to yield adjusted fueling values;

using the adjusted fueling values instead of the engine fueling data for fueling the engine during the forced regeneration cycle; and using the adjusted timing values for the timing of engine fueling during the forced regeneration cycle.

8. A method of imposing a forced regeneration cycle on a diesel particulate filter that treats exhaust gas passing through an exhaust system of a diesel engine to force regeneration of the filter, the method comprising:

during engine running time, repeatedly processing data that represents a rate at which diesel particulate matter (DPM) from the engine is entering the exhaust system, data that represents a rate at which DPM is being oxidized in the exhaust system, and data that represents DPM trapping efficiency of the filter, to yield values representing net rate at which DPM is being trapped in the filter at various points of times during the engine running time;

processing the values representing net rate at which DPM is being trapped in the filter and data representing effective geometric size of DPM trapping medium in the filter to yield values representing DPM trapped in the filter per unit of geometric size of the DPM trapping medium;

processing the values representing DPM trapped in the filter per unit of geometric size of the DPM trapping medium and data distinguishing values of DPM trapped in the filter per unit of geometric size of the DPM trapping medium that call for forced regeneration of the filter from those that do not call for forced regeneration; and when a result of the latter processing discloses that a value of data representing DPM trapped in the filter per unit of geometric size of the DPM trapping medium calls for regeneration of the filter, operating the engine in an elevated temperature mode of operation that elevates the exhaust gas temperature to a temperature for forcing regeneration of the filter, and when a subsequent result discloses that a value of data representing DPM trapped in the filter per unit of geometric size of the DPM trapping medium does not call for regeneration of the filter, discontinuing operation of the engine in the elevated temperature mode of operation.

9. A method as set forth in claim 8 including the further steps of:

during engine running time, repeatedly processing data that represents temperature of exhaust gas entering the filter, data that represents exhaust gas flow entering the filter, and data that utilizes both exhaust gas temperature and flow to distinguish a filter that has trapped an amount of DPM calling for forced regeneration from a filter that does not call for forced regeneration to yield additional data that a) calls for forced regeneration of the filter when the data that represents temperature of exhaust gas entering the filter and the data that represents exhaust gas flow entering the filter disclose that the filter has trapped an amount of DPM calling for forced regeneration, and b) calls for no forced regeneration when the data that represents temperature of exhaust gas entering the filter and the data that represents exhaust gas flow entering the filter disclose that the filter does not call for regeneration; and when the additional data calls for forced regeneration of the filter in the absence of a call for forced regeneration resulting from processing the values representing DPM trapped in the filter per unit of geometric size of the DPM trapping medium and data distinguishing values of DPM trapped in the filter per unit of geometric size of the DPM trapping medium, operating the engine in the elevated temperature mode of operation, and when subsequent additional data calls for no forced regeneration of the filter in the absence of a call for forced regeneration resulting from processing the values representing DPM trapped in the filter per unit of geometric size of the DPM trapping medium and data distinguishing values of DPM trapped in the filter per unit of geometric size of the DPM trapping medium, discontinuing operating the engine in the elevated temperature mode of operation.

10. A method as set forth in claim 8 wherein:

the step of processing the values representing DPM trapped in the filter per unit of geometric size of the DPM trapping medium and data distinguishing values of DPM trapped in the filter per unit of geometric size of the DPM trapping medium that call for forced regeneration of the filter from those that do not call for forced regeneration comprises a) comparing values representing DPM trapped in the filter per unit of geometric size of the DPM trapping medium and an upper limit of accumulation and b) comparing values representing DPM trapped in the filter per unit of geometric size of the DPM trapping medium and a lower limit of accumulation; and when comparison of values representing DPM trapped in the filter per unit of geometric size of the DPM trapping medium and the upper limit of accumulation discloses that a value of data representing DPM trapped in the filter per unit of geometric size of the DPM trapping medium is greater than the upper limit of accumulation, operating the engine in the elevated temperature mode of operation, and when comparison of values representing DPM trapped in the filter per unit of geometric size of the DPM trapping medium and the lower limit of accumulation discloses that a value of data representing DPM trapped in the filter per unit of geometric size of the DPM trapping medium is less than the lower limit of accumulation, discontinuing operating the engine in the elevated temperature mode of operation.

11. A method of imposing a forced regeneration cycle on a diesel particulate filter that treats exhaust gas passing through an exhaust system of a diesel engine to force regeneration of the filter, the method comprising:

during engine running time, repeatedly processing data for a first set of engine operating parameters to yield values representing amounts of accumulation of diesel particulate matter (DPM) in the filter at various points of times during the engine running time;

during engine running time, repeatedly processing data for a second set of engine operating parameters different from the first set of engine operating parameters to yield values representing amounts of accumulation of DPM in the filter at various points of times during the engine running time;

when the processing of data for one of the first and second sets of engine operating parameters discloses a value calling for regeneration of the filter, operating the engine in a mode of operation for forcing regeneration of the filter; and when a value resulting from subsequent processing of data for the one set of engine operating parameters discloses an amount of accumulation of DPM in the filter does not call for regeneration of the filter, discontinuing that mode of operation.

12. A method as set forth in claim 11 wherein:

the step of repeatedly processing data for a first set of engine operating parameters to yield values representing amounts of accumulation of DPM in the filter at various points of times during the engine running time comprises repeatedly processing data that includes a rate at which DPM from the engine is entering the exhaust system, a rate at which DPM is being oxidized in the exhaust system, and DPM trapping efficiency of the filter, to yield values representing net amounts of accumulation of DPM in the filter per unit of geometric size of DPM trapping medium in the filter at various points of times during the engine running time; and the step of repeatedly processing data for a second set of engine operating parameters different from the first set of engine operating parameters to yield values representing amounts of accumulation of diesel particulate matter (DPM) in the filter at various points of times during the engine running time comprises processing data that represents temperature of exhaust gas entering the filter, data that represents exhaust gas flow entering the filter, and data that utilizes both exhaust gas temperature and flow to distinguish a filter that has trapped an amount of diesel particulate matter (DPM) calling for forced regeneration from a filter that does not call for forced regeneration.

13. A method of imposing a forced regeneration cycle on a diesel particulate filter that treats exhaust gas passing through an exhaust system of a diesel engine to force regeneration of the filter, the method comprising:

providing engine fueling data representing engine fueling in the absence of forced regeneration of the filter;

as the forced regeneration cycle progresses, repeatedly processing both baseline engine fueling data representing engine fueling at commencement of the forced regeneration cycle and engine speed data that represents engine speed according to a map that correlates values representing various timings for engine fueling during the forced regeneration cycle with both values of baseline engine fueling and values of engine speed to yield timing values for the timing of engine fueling as the forced regeneration cycle progresses;

processing data representing light off temperature of catalytic material of the filter and data representing actual temperature of the catalytic material, as the forced regeneration cycle progresses, to yield adjustment values for adjusting the timing values;

processing the adjustment values and the timing values to yield adjusted timing values for the timing of engine fueling during the forced regeneration cycle;

processing the adjusted timing values and the engine speed data according to a map that correlates fueling modification values with both the adjusted timing values and values of engine speed to yield fueling modification values;

processing the engine fueling data and the fueling modification values to yield adjusted fueling values;

using the adjusted fueling values instead of the engine fueling data for fueling the engine during the forced regeneration cycle; and using the adjusted timing values for the timing of engine fueling during the forced regeneration cycle.

14. A method as set forth in claim 13 wherein the step of processing data representing light off temperature of catalytic material of the filter and data representing actual temperature of the catalytic material, as the forced regeneration cycle progresses, to yield adjustment values for adjusting the timing values comprises:

rate limiting the data representing light off temperature of catalytic material of the filter to yield a succession of values that, over a span of time, progressively approach, and finally arrive at, a value representing the light off temperature;

processing the succession of values and the data representing actual temperature of the catalytic material, as the forced regeneration cycle progresses, to yield error data; and processing the error data through a P-I-D function that performs one of more of proportional, derivative, and integral functions on the error data to yield the adjustment values for adjusting the timing values.

15. A method as set forth in claim 14 wherein the step of processing the adjustment values and the timing values to yield adjusted timing values for the timing of engine fueling during the forced regeneration cycle comprises:

algebraically summing the adjustment values and the timing values to yield a succession of sums, and then rate limiting the succession of sums to yield the adjusted timing values.

16. A method as set forth in claim 13 wherein the step of processing the adjustment values and the timing values to yield adjusted timing values for the timing of engine fueling during the forced regeneration cycle comprises:

algebraically summing the adjustment values and the timing values to yield a succession of sums, and then rate limiting the succession of sums to yield the adjusted timing values.

17. A method for developing diesel particulate matter (DPM) oxidation rate data representing the rate at which DPM in diesel engine exhaust gas is being oxidized during passage through an exhaust system of a diesel engine that includes a diesel particulate filter that treats the exhaust gas, the method comprising:

during engine running time, repeatedly processing data that represents parameters useful in determining the concentration of $NO_x$ in exhaust gas entering the exhaust system from the engine to yield $NO_x$ concentration data for $NO_x$ concentration in the exhaust gas; and repeatedly processing a) the $NO_x$ concentration data, b) data representing concentration of $O_2$ in the exhaust gas entering the filter, c) data representing temperature of exhaust gas entering the filter, and d) data for developing DPM oxidation rate data from $NO_x$ concentration data, $O_2$ concentration data, and exhaust gas temperature data, to yield values of DPM oxidation rate data representing the rate at which DPM is being oxidized in the exhaust system.

18. A turbocharged diesel engine comprising:

an exhaust system comprising a diesel particulate filter that treats exhaust gas from the engine; and a control system for imposing a forced regeneration cycle on the diesel particulate filter to force regeneration of the filter, wherein the control system comprises a processor that a) during engine running time, repeatedly processes data that represents engine speed, data that represents engine fueling, data that represents turbocharger boost, and data that represents exhaust gas recirculation (EGR) from the exhaust system back into the engine, through an engine emissions model to yield values representing rates at which diesel particulate matter (DPM) from the engine is entering the exhaust system and values for $NO_x$ concentration in the exhaust gas, b) repeatedly processes the values for $NO_x$ concentration in the exhaust gas, values representing concentration of $O_2$ in the exhaust gas entering the filter, and values representing temperature of exhaust gas entering the filter through a DPM oxidation model to yield values of DPM oxidation rate data representing the rate at which DPM is being oxidized in the exhaust system, c) repeatedly processes the values of DPM oxidation rate data and the values representing a rate at which DPM from the engine is entering the exhaust system data through a DPM accumulation model to yield values of net DPM accumulation representing net accumulation of DPM in the filter at various points of time during engine running time, d) repeatedly processes accumulated engine running time through an ash accumulation model to yield data representing ash accumulation in the filter, and e) repeatedly processes the values of net DPM accumulation and the data representing ash accumulation in the filter through regeneration initiating/terminating logic for commanding a forced regeneration cycle when a result of the latter processing calls for initiation of forced regeneration of the filter and for discontinuing the forced regeneration cycle when a subsequent result calls for termination of the forced regeneration cycle.

19. An engine as set forth in claim 18 in which the processor's processing of the values of DPM oxidation rate data and the values representing a rate at which DPM from the engine is entering the exhaust system data through a DPM accumulation model to yield values of net DPM accumulation representing net accumulation of DPM in the filter at various points of time during engine running time also comprises processing data representing DPM trapping efficiency of the filter and data representing effective geometric size of DPM trapping medium in the filter to yield values representing net DPM trapped in the filter per unit of geometric size of the DPM trapping medium.

20. An engine as set forth in claim 19 in which the processor's processing of the values of net DPM accumulation and the data representing ash accumulation in the filter through regeneration initiating/terminating logic for commanding a forced regeneration cycle when of a result of the latter processing calls for initiation of forced regeneration of the filter and for discontinuing the forced regeneration cycle when a subsequent result calls for termination of the forced regeneration cycle comprises processing the values representing DPM trapped in the filter per unit of geometric size of the DPM trapping medium and data distinguishing values of DPM trapped in the filter per unit of geometric size of the DPM trapping medium that call for forced regeneration of the filter from those that do not call for forced regeneration, and when a result of the latter processing discloses that a value of data representing DPM trapped in the filter per unit of geometric size of the DPM trapping medium calls for regeneration of the filter, causes the engine to operate in an elevated temperature mode of operation that elevates the exhaust gas temperature to a temperature for forcing regeneration of the filter, and when a subsequent result discloses that a value of data representing DPM trapped in the filter per unit of geometric size of the DPM trapping medium does not call for regeneration of the filter, causes discontinuance of the operation of the engine in the elevated temperature mode of operation.

21. An engine as set forth in claim 18 in which the processor causes the engine to execute a forced regeneration cycle in consequence of a command for a forced regeneration cycle, and as the forced regeneration cycle progresses, the processor a) repeatedly processes both baseline engine fueling data representing engine fueling at commencement of the forced regeneration cycle and engine speed data that represents engine speed according to a map that correlates values representing various timings for engine fueling during the forced regeneration cycle with both values of baseline engine fueling and values of engine speed to yield timing values for the timing of engine fueling as the forced regeneration cycle progresses, b) repeatedly processes both baseline engine fueling data representing engine fueling at commencement of the forced regeneration cycle and engine speed data that represents engine speed according to a map that correlates values representing various timings for engine fueling during the forced regeneration cycle with both values of baseline engine fueling and values of engine speed to yield timing values for the timing of engine fueling as the forced regeneration cycle progresses, c) processes data representing light off temperature of catalytic material of the filter and data representing actual temperature of the catalytic material, as the forced regeneration cycle progresses, to yield adjustment values for adjusting the timing values, d) processes the adjustment values and the timing values to yield adjusted timing values for the timing of engine fueling during the forced regeneration cycle, e) processes the adjusted timing values and the engine speed data according to a map that correlates fueling modification values with both the adjusted timing values and values of engine speed to yield fueling modification values, f) processes engine fueling data representing engine fueling in the absence of forced regeneration of the filter and the fueling modification values to yield adjusted fueling values, g) causes the adjusted fueling values instead of the engine fueling data to be used for fueling the engine during the forced regeneration cycle, and h) causes the adjusted timing values to be used for the timing of engine fueling during the forced regeneration cycle.

22. An engine as set forth in claim 1 in which the processor, in consequence of a command for a forced regeneration cycle, causes the engine to execute a forced regeneration cycle that comprises elevating the exhaust gas temperature to a temperature for forcing regeneration of the filter, and during elevation of the exhaust gas temperature, regulates boost of a turbocharger that is powered by engine exhaust gas to deliver charge air to the engine to counteract the full effect of the elevation of exhaust gas temperature on turbocharger boost.

23. A turbocharged diesel engine comprising:

an exhaust system comprising a diesel particulate filter that treats exhaust gas from the engine; and a control system for imposing a forced regeneration cycle on the diesel particulate filter to force regeneration of the filter, wherein the control system comprises a processor that
- a) during engine running time, repeatedly processes data that represents parameters useful in determining a rate at which diesel particulate matter (DPM) is accumulating in the filter through a DPM accumulation model to yield values of DPM accumulation representing accumulation of DPM in the filter at various points of time during engine running time,
- b) processes the values of DPM accumulation and data that distinguishes DPM accumulation values calling for forced regeneration of the filter from those not calling for forced regeneration of the filter,
- c) when a result of the latter processing discloses that a DPM accumulation value calls for forced regeneration of the filter, initiates forced regeneration by retarding the timing of engine fueling to elevate the exhaust gas temperature to a temperature for forcing regeneration of the filter,
- d) as the forced regeneration cycle progresses, repeatedly processes baseline engine fueling data representing engine fueling at commencement of the forced regeneration cycle, engine speed data that represents engine speed, data representing light off temperature of catalytic material of the filter, and data representing actual temperature of the catalytic material, to yield adjusted timing values for timing of engine fueling and fueling modification values;

processes engine fueling data that represents engine fueling in the absence of forced regeneration of the filter and the fueling modification values to yield adjusted fueling values;

causes the adjusted fueling values instead of the engine fueling data to be used for fueling the engine during the forced regeneration cycle; and causes the adjusted timing values to be used for the timing of engine fueling during the forced regeneration cycle.

24. A turbocharged diesel engine comprising:

an exhaust system comprising a diesel particulate filter that treats exhaust gas from the engine; and a control system for imposing a forced regeneration cycle on the diesel particulate filter to force regeneration of the filter, wherein the control system comprises a processor that
- a) during engine running time, repeatedly processes data that represents temperature of exhaust gas entering the filter, data that represents exhaust gas flow entering the filter, and data that utilizes both exhaust gas temperature and flow to distinguish a filter that has trapped an amount of diesel particulate matter (DPM) calling for forced regeneration from a filter that does not call for forced regeneration to yield result data that 1) calls for forced regeneration of the filter when the data that represents temperature of exhaust gas entering the filter and the data that represents exhaust gas flow entering the filter disclose that the filter has trapped an amount of DPM calling for forced regeneration, and 2) calls for no forced regeneration when the data that represents temperature of exhaust gas entering the filter and the data that represents exhaust gas flow entering the filter disclose that the filter does not call for regeneration,
- b) when the result data calls for forced regeneration of the filter, initiates forced regeneration by retarding the timing of engine fueling to elevate the exhaust gas temperature to a temperature for forcing regeneration of the filter,
- c) as the forced regeneration cycle progresses, repeatedly processes baseline engine fueling data representing engine fueling at commencement of the forced regeneration cycle, engine speed data that represents engine speed, data representing light off temperature of catalytic material of the filter, and data representing actual temperature of the catalytic material, to yield adjusted timing values for timing of engine fueling and fueling modification values,
- d) processes engine fueling data representing engine fueling in the absence of forced regeneration of the filter and the fueling modification values to yield adjusted fueling values,
- e) causes the adjusted fueling values instead of the engine fueling data to be used for fueling the engine during the forced regeneration cycle, and
- f) causes the adjusted timing values to be used for the timing of engine fueling during the forced regeneration cycle.

25. A turbocharged diesel engine comprising:

an exhaust system comprising a diesel particulate filter that treats exhaust gas from the engine; and a control system for imposing a forced regeneration cycle on the diesel particulate filter to force regeneration of the filter, wherein the control system comprises a processor that
- a) during engine running time, repeatedly processes data that represents a rate at which diesel particulate matter (DPM) from the engine is entering the exhaust system, data that represents a rate at which DPM is being oxidized in the exhaust system, and data that represents DPM trapping efficiency of the filter, to yield values representing net rate at which DPM is being trapped in the filter at various points of times during the engine running time,
- b) processes the values representing net rate at which DPM is being trapped in the filter and data representing effective geometric size of DPM trapping medium in the filter to yield values representing DPM trapped in the filter per unit of geometric size of the DPM trapping medium,
- c) processes the values representing DPM trapped in the filter per unit of geometric size of the DPM trapping medium and data distinguishing values of DPM trapped in the filter per unit of geometric size of the DPM trapping medium that call for forced regeneration of the filter from those that do not call for forced regeneration, and d) when a result of the latter processing discloses that a value of data representing DPM trapped in the filter per unit of geometric size of the DPM trapping medium calls for regeneration of the filter, causes the engine to operate in an elevated temperature mode of operation that elevates the exhaust gas temperature to a temperature for forcing regeneration of the filter, and e) when a subsequent result discloses that a value of data representing DPM trapped in the filter per unit of geometric size of the DPM trapping medium does not call for regeneration of the filter, causes discontinuance of operation of the engine in the elevated temperature mode of operation.

26. An engine as set forth in claim 25 wherein the processor a) during engine running time, repeatedly processes data that represents temperature of exhaust gas entering the filter, data that represents exhaust gas flow entering the filter, and data that utilizes both exhaust gas temperature and flow to distinguish a filter that has trapped an amount of DPM calling for forced regeneration from a filter that does not call for forced regeneration to yield additional data that 1) calls for forced regeneration of the filter when the data that represents temperature of exhaust gas entering the filter and the data that represents exhaust gas flow entering the filter disclose that the filter has trapped an amount of DPM calling for forced regeneration, and 2) calls for no forced regeneration when the data that represents temperature of exhaust gas entering the filter and the data that represents exhaust gas flow entering the filter disclose that the filter does not call for regeneration; and b) when the additional data calls for forced regeneration of the filter in the absence of a call for forced regeneration resulting from processing the values representing DPM trapped in the filter per unit of geometric size of the DPM trapping medium and data distinguishing values of DPM trapped in the filter per unit of geometric size of the DPM trapping medium, causes the engine to operate in the elevated temperature mode of operation, and c) when subsequent additional data calls for no forced regeneration of the filter in the absence of a call for forced regeneration resulting from processing the values representing DPM trapped in the filter per unit of geometric size of the DPM trapping medium and data distinguishing values of DPM trapped in the filter per unit of geometric size of the DPM trapping medium, causes discontinuance of operation of the engine in the elevated temperature mode of operation.

27. An engine as set forth in claim 25 wherein:

a) the processor's processing of the values representing DPM trapped in the filter per unit of geometric size of the DPM trapping medium and data distinguishing values of DPM trapped in the filter per unit of geometric size of the DPM trapping medium that call for forced regeneration of the filter from those that do not call for forced regeneration comprises 1) comparing values representing DPM trapped in the filter per unit of geometric size of the DPM trapping medium and an upper limit of accumulation and 2) comparing values representing DPM trapped in the filter per unit of geometric size of the DPM trapping medium and a lower limit of accumulation, and b) when comparison of values representing DPM trapped in the filter per unit of geometric size of the DPM trapping medium and the upper limit of accumulation discloses that a value of data representing DPM trapped in the filter per unit of geometric size of the DPM trapping medium is greater than the upper limit of accumulation, the processor causes the engine to operate in the elevated temperature mode of operation, and c) when comparison of values representing DPM trapped in the filter per unit of geometric size of the DPM trapping medium and the lower limit of accumulation discloses that a value of data representing DPM trapped in the filter per unit of geometric size of the DPM trapping medium is less than the lower limit of accumulation, the processor causes discontinuance of operation of the engine in the elevated temperature mode of operation.

28. A turbocharged diesel engine comprising:

an exhaust system comprising a diesel particulate filter that treats exhaust gas from the engine; and a control system for imposing a forced regeneration cycle on the diesel particulate filter to force regeneration of the filter, wherein the control system comprises a processor that a) during engine running time, repeatedly processes data for a first set of engine operating parameters to yield values representing amounts of accumulation of diesel particulate matter (DPM) in the filter at various points of times during the engine running time, b) during engine running time, repeatedly processes data for a second set of engine operating parameters different from the first set of engine operating parameters to yield values representing amounts of accumulation of DPM in the filter at various points of times during the engine running time, c) when the processing of data for one of the first and second sets of engine operating parameters discloses a value calling for regeneration of the filter, causes the engine to operate in a mode of operation for forcing regeneration of the filter, and d) when a value resulting from subsequent processing of data for the one set of engine operating parameters discloses an amount of accumulation of DPM in the filter does not call for regeneration of the filter, cause discontinuance of that mode of operation.

29. An engine as set forth in claim 28 wherein a) the processor's repeated processing of data for a first set of engine operating parameters to yield values representing amounts of accumulation of DPM in the filter at various points of times during the engine running time comprises repeatedly processing data that includes a rate at which DPM from the engine is entering the exhaust system, a rate at which DPM is being oxidized in the exhaust system, and DPM trapping efficiency of the filter, to yield values representing net amounts of accumulation of DPM in the filter per unit of geometric size of DPM trapping medium in the filter at various points of times during the engine running time, and b) the processor's repeated processing of data for a second set of engine operating parameters different from the first set of engine operating parameters to yield values representing amounts of accumulation of diesel particulate matter (DPM) in the filter at various points of times during the engine running time comprises processing data that represents temperature of exhaust gas entering the filter, data that represents exhaust gas flow entering the filter, and data that utilizes both exhaust gas temperature and flow to distinguish a filter that has trapped an amount of diesel particulate matter (DPM) calling for forced regeneration from a filter that does not call for forced regeneration.

30. A turbocharged diesel engine comprising:

an exhaust system comprising a diesel particulate filter that treats exhaust gas from the engine; and a control system for imposing a forced regeneration cycle on the diesel particulate filter to force regeneration of the filter, wherein the control system comprises a processor that
   a) as the forced regeneration cycle progresses, repeatedly processes both baseline engine fueling data representing engine fueling at commencement of the forced regeneration cycle and engine speed data that represents engine speed according to a map that correlates values representing various timings for engine fueling during the forced regeneration cycle with both values of baseline engine fueling and values of engine speed to yield timing values for the timing of engine fueling as the forced regeneration cycle progresses,
   b) processes data representing light off temperature of catalytic material of the filter and data representing actual temperature of the catalytic material, as the forced regeneration cycle progresses, to yield adjustment values for adjusting the timing values,
   c) processes the adjustment values and the timing values to yield adjusted timing values for the timing of engine fueling during the forced regeneration cycle,
   d) processes the adjusted timing values and the engine speed data according to a map that correlates fueling modification values with both the adjusted timing values and values of engine speed to yield fueling modification values,
   e) processes engine fueling data representing engine fueling in the absence of forced regeneration of the filter and the fueling modification values to yield adjusted fueling values,
   f) causes the adjusted fueling values instead of the engine fueling data to be used for fueling the engine during the forced regeneration cycle, and
   g) causes the adjusted timing values to be used for the timing of engine fueling during the forced regeneration cycle.

31. An engine as set forth in claim 30 wherein as the forced regeneration cycle progresses, the processor's processing of data representing light off temperature of catalytic material of the filter and data representing actual temperature of the catalytic material to yield adjustment values for adjusting the timing values comprises
   a) rate limiting the data representing light off temperature of catalytic material of the filter to yield a succession of values that, over a span of time, progressively approach, and finally arrive at, a value representing the light off temperature,
   b) processing the succession of values and the data representing actual temperature of the catalytic material, as the forced regeneration cycle progresses, to yield error data; and
   c) processing the error data through a P-I-D function that performs one of more of proportional, derivative, and integral functions on the error data to yield the adjustment values for adjusting the timing values.

32. An engine as set forth in claim 31 wherein the processor's processing of the adjustment values and the timing values to yield adjusted timing values for the timing of engine fueling during the forced regeneration cycle comprises
   a) algebraically summing the adjustment values and the timing values to yield a succession of sums, and then
   b) rate limiting the succession of sums to yield the adjusted timing values.

33. An engine as set forth in claim 30 wherein the processor's processing of the adjustment values and the timing values to yield adjusted timing values for the timing of engine fueling during the forced regeneration cycle comprises
   a) algebraically summing the adjustment values and the timing values to yield a succession of sums, and then
   b) rate limiting the succession of sums to yield the adjusted timing values.

34. A turbocharged diesel engine comprising:

an exhaust system comprising a diesel particulate filter that treats exhaust gas from the engine; and a control system for imposing a forced regeneration cycle on the diesel particulate filter to force regeneration of the filter, wherein the control system comprises a processor that
   a) during engine running time, repeatedly processes data that represents parameters useful in determining the concentration of $NO_x$ in exhaust gas entering the exhaust system from the engine to yield $NO_x$ concentration data for $NO_x$ concentration in the exhaust gas; and
   b) repeatedly processing 1) the $NO_x$ concentration data, 2) data representing concentration of $O_2$ in the exhaust gas entering the filter, 3) data representing temperature of exhaust gas entering the filter, and 4) data for developing DPM oxidation rate data from $NO_x$ concentration data, $O_2$ concentration data, and exhaust gas temperature data, to yield values of DPM oxidation rate data representing the rate at which DPM is being oxidized in the exhaust system.

* * * * *